United States Patent [19]
Sugimoto et al.

[11] Patent Number: 4,917,658
[45] Date of Patent: Apr. 17, 1990

[54] FRICTION PLATE FOR CVT CHAIN

[75] Inventors: Yoshiaki Sugimoto; Toshihiro Hosokawa; Yutaka Uchiumi, all of Saitama; Shuji Sasamoto, Osaka; Nobuyuki Fujimoto, Saitama, all of Japan

[73] Assignee: Tsubakimoto Chain Co., Japan

[21] Appl. No.: 375,606

[22] Filed: Jul. 5, 1989

[30] Foreign Application Priority Data

Jul. 5, 1988 [JP] Japan ................................ 63-88463

[51] Int. Cl.⁴ .............................................. F16G 1/22
[52] U.S. Cl. .................................... 474/242; 474/244
[58] Field of Search ............... 474/242, 244, 201, 237, 474/270; 156/137-142

[56] References Cited

U.S. PATENT DOCUMENTS 2,647,410  8/1953  Reeves ................................ 474/244
4,213,350  7/1980  Horowitz et al. ............. 474/244 X

FOREIGN PATENT DOCUMENTS 0116147  6/1986  Japan ................................ 474/244

Primary Examiner—Thuy M. Bui
Attorney, Agent, or Firm—Steele, Gould & Fried

[57] ABSTRACT

An improved friction drive chain especially for a continuously variable transmission has a plurality of friction plates, each of the friction plates being substantially I-shaped in lateral section. The friction plates are arranged adjacent one another and connected by connecting link elements received in recesses formed in both lateral sides of the friction plates between upper and lower beam members of said friction plates. The connecting link elements are laterally grooved to bear longitudinally against the friction plates. The outer surfaces of the lower beam members of the plates define friction drive surfaces for contact with driving and/or driven pulleys. The friction plates are heat treated to increase strength, for example by quenching and annealing. The friction drive surfaces are formed with hardened layers by surface hardening treatment such as by electron beam or laser.

11 Claims, 1 Drawing Sheet

FRICTION PLATE FOR CVT CHAIN

BACKGROUND OF THE INVENTION

1. Field of the Invention

This invention relates to the field of power transmission chains, and in particular to a friction plate structure of improved durability and frictional surface hardness, for a continuously variable transmission ("CVT") chain.

2. Prior Art

In a friction drive assembly for a continuously variable transmission or CVT, a power transmitting chain defining a tapering lateral contour is routed around a driving pulley and a driven pulley, at least one of the pulleys having inwardly-facing conical surfaces that can be adjusted in their axial separation to thereby adjust the effective radius at which the chain passes around the pulley. In this manner, the ratio of power transmission between the pulleys is continuously variable between upper and lower limits.

Friction drive elements for CVT chains known in the art can be classified in two categories. One type of chain, as exemplified by the disclosure of Japanese Patent Publication Gazette No. 23820/1982, uses a chain formed using frictional elements which are plate-like. The frictional elements have an I-shaped cross-section, i.e., each frictional element or friction plate has an upper (or outer) transverse beam member and a lower (or inner) beam member. One of the beam members is tapered or V-shaped in cross-section and spans the distance between the spaced sheaves of the pulley. This V-shaped taper on the beam member of the I-shaped link or friction plate bears inward forces exerted on the chain by the sheaves of the pulleys in the frictional engagement of the chain and the pulleys when transmitting power. Referring to FIG. 2 hereof, a V-shaped, pulley-engaging frictional drive surface is defined by the surface F" of the lower or inner beam member of the I-shaped friction drive element F.

A second type of known chain, as exemplified by Japanese Patent Application No. 258240/1987 (now laid open), is formed by frictional elements which are block-like, having a V-shaped cross-section. The force and friction bearing surfaces on the V-shaped friction block extend all the way up the lateral sides. Moreover, the block has a relatively greater amount of material than an I-shaped block, for bearing laterally inward forces.

In the case of the former, I-shaped type of chain, the surface area of the friction drive surface applied to the pulleys is smaller than that of the latter full V-shaped type. Accordingly, pressure per unit area of pulley contact, due to the pressing force of the surfaces of pulleys, tends to sharply increase. The I-shaped structure substantially increases the frictional force per unit area between the friction plates and the pulleys. At the same time, the I-shaped structure must have sufficient strength to withstand laterally inward pressing forces exerted by the pulleys, resisting bending and/or breakage.

The present invention relates to the I-shaped type of CVT chain frictional element. In conventional I-shaped friction plates, high class steel material having good tenacity and/or toughness has been used. The plates are heat treated, such as by quenching and annealing, to increase strength and improve the service life of the frictional elements notwithstanding the substantially heavy loads on this type of structure as explained above.

However, although strength so as to withstand the pressing force as mentioned above may be imparted to the friction plate by means of quenching and annealing, it is not possible in this manner to give hardness to the friction drive surface of the lower beam member of the friction plate so as to withstand the huge frictional force. If the material of the friction plates is provided with necessary hardness to enable the friction plates to resist friction, the friction plates tend to lose toughness and may be unduly brittle. Consequently, the plates are subject to damage due to the impulse force occurring on each friction plate as the chain winds itself around the pulleys. Moreover, the bending strength against the aforementioned pressing force applied to the lower beam member F' deteriorates.

SUMMARY OF THE INVENTION

It is an object of the invention to improve resistance to both frictional loads and structural loads on an I-shaped CVT frictional element, whereby the CVT chain is more durable and long-lived. This and other objects are accomplished by an improved friction drive chain especially for a continuously variable transmission. The chain has a plurality of friction plates, each of the plates being substantially I-shaped in lateral section. The plates are arranged adjacent one another and connected by chain link elements inserted into recesses formed in both lateral sides of the plates between upper and lower beam members of said plates. The connecting link elements bear longitudinally against the friction plates by means of lateral grooves formed in the connecting links where they engage against the upper and lower beam members, for preventing longitudinal displacement of the connecting links relative to the plates. The outer surfaces of the lower beam members of the plates define friction drive surfaces for contact with driving and/or driven pulleys. The friction plates are heat treated to increase strength, for example by quenching and annealing. The friction drive surfaces are formed with hardened layers by means of surface hardening treatment such as by electron beam or laser.

The present invention provides a friction plate of good structural strength, wherein the plates are heat treated by means of quenching and annealing. Thereafter, only the friction drive surface is given surface hardening treatment so as to form a hardened layer thereon without adversely affecting the structural strength of the frictional element in the central area of the lower beam member disposed between the pulley sheaves. The invention thus not only increases the overall strength of the friction plates, but also increases the surface hardness of the friction plates at the friction drive surfaces thereof so as to withstand the huge frictional force acting thereon.

Namely, since the friction plate as a whole is given heat treatment of quenching and annealing, its strength against impulse as well as momental forces is substantially improved as compared to an untreated or merely hardened article. The surface hardening treatment given solely to the friction drive surface serves to impart the hardness to withstand the huge pressing and frictional forces bearing thereon. Thus, both the desired strength and anti-wear properties of the friction plate are ensured, which substantially increases the freedom of selection of materials for the friction plates and improves the expected service life of friction plates of a given material.

DETAILED DESCRIPTION OR THE PREFERRED EMBODIMENTS

Figure 1:
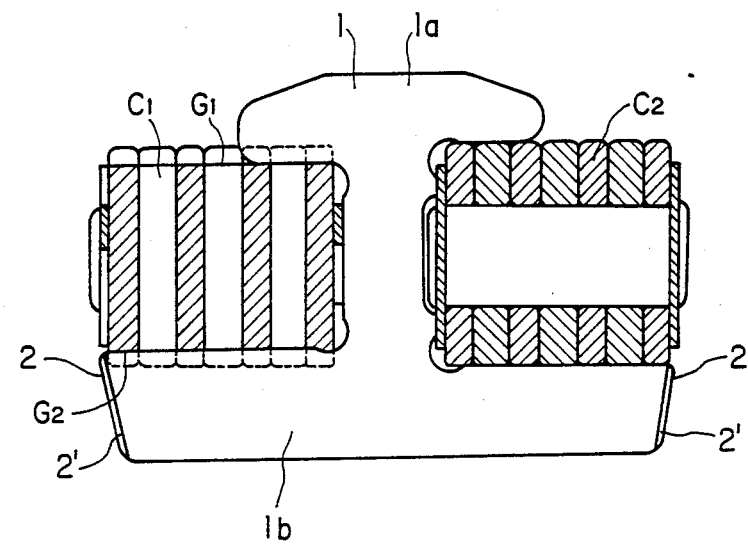
FIG. 1 is a front view, partly in section, of a friction plate forming a segment of an endless friction drive chain; and, FIG. 2 is a perspective view of a continuously variable transmission (CVT) in which a friction drive chain of the subject I-shaped type is utilized.

FIG. 1 shows a front view, partly in section, of a friction plate to which an endless friction drive chain is mounted. Recesses are formed in the left and right sides of the web portion between the upper and lower beam members of each of a plurality of I-shaped friction plates 1. Connecting link elements C1, C2 are disposed in side-by-side relationship to connect adjacent ones of the friction plates, defining an endless frictionally driven chain for engagement with driving and driven pulleys as illustrated schematically in FIG. 2.

The connecting links C1, C2 at the area of contact with the upper and lower beam members 1a, 1b define lateral grooves G1, G2, formed to engage the upper and lower edges respectively of the link plates of said chains C1 and C2 against the friction plates 1, providing a longitudinally abutting contact between the connecting links and the friction plates which prevents longitudinal relative displacement between the chains C1 and C2 and the friction plates 1. Although FIG. 1 illustrates the grooves G1, G2 in the connecting links for chain C1 only, similar grooves are formed in the connecting links for the opposite lateral link plates, i.e., in the edges of the chain C2. The connecting links are grooved at offset positions such that the upper and lower beam members 1a, 1b of the next adjacent friction plate in FIG. 1 may fit against grooves of the connecting link elements which bear against them. In other words, grooves corresponding to grooves G1, G2 as shown in FIG. 1 are formed in the connecting links on the laterally opposite side of the chain friction plate for accommodating the longitudinally directed edges of the next successive friction plate, whereby the friction plates are all supported on both lateral sides.

The friction plate 1 as a whole is made of high class steel material having inherent tenacity or toughness. Moreover, the friction plates are subjected to heat treatment by means of quenching and annealing to further improve the structural strength of the plates as needed to resist damage such as bending or breakage resulting from inward forces exerted on the friction plates by the pulleys. Quenching involves a sudden temperature reduction of hot formed parts, for example by immersing them in a relatively cool liquid. Annealing is accomplished, for example, by subjecting the parts to an extended period of moderately elevated temperature, insufficient to appreciably soften the parts, but allowing internal stresses in the material of the parts to equalize, which stresses may be due in part to temperature cycling during quenching.

The force exerted by the pulleys includes both the simple laterally inward pressure of the pulley sheaves and a form of impact force occurring as each of the frictional plates comes into engagement with the pulley sheaves. These forces are borne by the material of the friction plates, and in particular by the body of lower beam member 1b, as a whole. The friction plates according to the invention are also further adapted to resist frictional forces at the lateral surfaces of the plates, where the plates come into contact with the pulley sheaves and are subject to abrasion.

Figure 2:
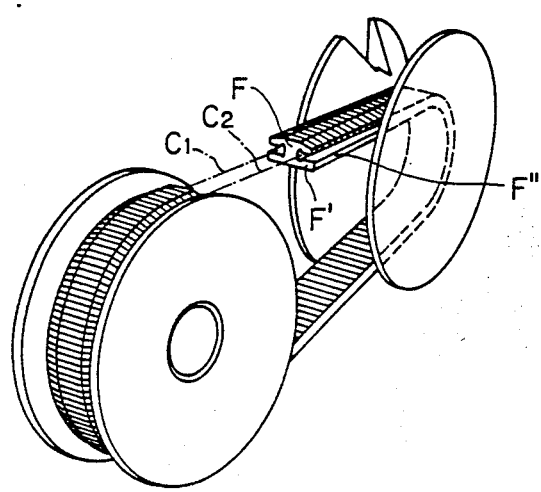

The laterally opposite outer surfaces 2,2 of the lower beam member 1b in the illustrated embodiment are the friction surfaces adapted to contact the corresponding conical inward-facing surfaces of the pulleys as shown generally in FIG. 2. Hardened layers 2', 2' are formed thereon by means, for example, of laser beam or electron beam. Other suitable means may of course be employed for the purpose of surface hardening, for example chemical treatments, other forms of radiation hardening, and the like.

The invention as disclosed herein is a friction drive chain with a plurality of friction plates 1 arranged adjacent one another, the friction plates 1 being substantially I-shaped in lateral section, each having an upper beam member 1a and a lower beam member 1b. Connecting elements C1, C2 for the friction plates 1 are provided, the friction plates 1 being received in recesses defined between the upper and lower beam members 1a, 1b, on both lateral sides of said friction plates 1, to form an endless chain.

The upper and lower beam members 1a, 1b of said friction plates 1 are engaged with the connecting links C1, C2 partly by means of grooves G1, G2 along the upper and lower portions of the link plates of said connecting elements C1, C2, laterally outer surfaces 2 of the lower beam member 1b of each of said friction plates 1 forming friction drive surfaces 2 for contact with a pulley. The friction plates 1 are heat treated to increase structural strength, and said friction drive surfaces 2 are surface hardened to form abrasion resistant layers 2' by means of a surface hardening treatment. The friction plates 1 are quenched and annealed during heat treatment to increase structural strength. The friction drive surfaces 2 are hardened by a surface treatment including hardening by application of radiation, for example electron beam radiation or laser radiation to form the abrasion resistant layers 2'.

Accordingly, the invention involves an improvement of the known friction drive chain of the type having a plurality of substantially I-shaped friction plates arranged adjacent one another and connected by connecting links to form endless chains, the connecting links being inserted between upper and lower beam members into recesses formed in both sides of said plates, and the upper and lower beam members of said plates are engaged against grooves formed in upper and lower portions of the connecting links, respectively, laterally outer surfaces of the lower beam members of said plates defining friction drive surfaces for contact with a pulley. The friction plates 1 preferably are surface hardened only on said friction drive surfaces 2.

The invention may be characterized as a method of manufacturing a friction drive chain or a method of improving the known chain of the type having a plurality of substantially I-shaped friction plates 1 arranged adjacent one another and connected by connecting links C1, C2 to form endless chains, the connecting links C1, C2 being inserted between upper and lower beam members 1a, 1b of the friction plates 1, into recesses formed in both sides of said plates. The upper and lower beam members 1a, 1b of said plates 1 are engaged against grooves formed in upper and lower portions of the connecting links C1, C2, respectively, laterally outer surfaces 2 of the lower beam members 1b of said friction plates 1 defining friction drive surfaces 2 for contact with a pulley. The method includes the steps of heat treating the friction plates 1 to thereby increase structural strength, and surface hardening said friction drive surfaces 2 by means of a surface hardening treatment, forming abrasion resistant layers 2', whereby the friction plates 1 retain structural strength while the friction drive surfaces 2 are rendered wear resistant. The heat treating, for example, includes quenching and annealing. The surface hardening includes application of radiation to said friction drive surfaces only, the radiation being chosen, for example, from the group electron beam radiation and laser radiation. Chemical surface hardening is also possible.

The invention having been disclosed, a number of variations will now become apparent to persons skilled in the art. Reference should be made to the appended claims rather than the foregoing specification, to determine the scope of exclusive rights claimed.

We claim:
1. A friction drive chain comprising:
a plurality of friction plates arranged adjacent one another, the friction plates being substantially I-shaped in lateral section and having upper and lower beam members;
connecting elements for the friction plates, said connecting elements being received in recesses defined between the upper and lower beam members, on both lateral sides of said friction plates, to form an endless chain, the upper and lower beam members of said friction plates being engaged with the connecting links partly by means of grooves along the upper and lower portions of the link plates of said connecting elements, laterally outer surfaces of the lower beam member of each of said friction plates forming friction drive surfaces for contact with a pulley, and wherein the friction plates are heat treated to increase structural strength, and said friction drive surfaces are surface hardened to form abrasion resistant layers by means of a surface hardening treatment.

2. The friction drive chain of claim 1, wherein the friction plates are quenched and annealed.

3. The friction drive chain of claim 1, wherein the friction drive surfaces are hardened by a surface treatment including hardening by application of radiation.

4. The friction drive chain of claim 3, wherein the friction plates are surface hardened by radiation chosen from the group electron beam radiation and laser radiation.

5. An improved friction drive chain of the type having a plurality of substantially I-shaped friction plates arranged adjacent one another and connected by connecting links to form endless chains, the connecting links being inserted between upper and lower beam members into recesses formed in both sides of said plates, and the upper and lower beam members of said plates are engaged against grooves formed in upper and lower portions of the connecting links, respectively, laterally outer surfaces of the lower beam members of said plates defining friction drive surfaces for contact with a pulley, the improvement comprising:
the friction plates being heat treated to increase structural strength and said friction drive surfaces having hardened surface layers formed by means of a surface hardening treatment.

6. The improved friction drive chain of claim 5, wherein the friction plates are surface hardened only on said friction drive surfaces.

7. A method of manufacturing a friction drive chain of the type having a plurality of substantially I-shaped friction plates arranged adjacent one another and connected by connecting links to form endless chains, the connecting links being inserted between upper and lower beam members into recesses formed in both sides of said plates, and the upper and lower beam members of said plates are engaged against grooves formed in upper and lower portions of the connecting links, respectively, laterally outer surfaces of the lower beam members of said plates defining friction drive surfaces for contact with a pulley, comprising the steps of:
heat treating the friction plates to thereby increase structural strength; and,
surface hardening said friction drive surfaces by means of a surface hardening treatment, whereby the friction plates retain structural strength while the friction drive surfaces are rendered wear resistant.

8. The method of manufacture of claim 7, wherein the heat treating includes quenching and annealing.

9. The method of manufacture of claim 7, wherein the surface hardening includes application of radiation to said friction drive surfaces only.

10. The method of manufacture of claim 7, wherein the radiation is chosen from the group electron beam radiation and laser radiation.

11. The method of manufacture of claim 8, wherein the surface hardening includes application of radiation to said friction drive surfaces only.

* * * * *